United States Patent [19]

Marhevka

[11] Patent Number: 6,066,699
[45] Date of Patent: May 23, 2000

[54] ADHESIVE OF EPOXY RESIN AND OH-TERMINATED POLYESTER WITH $C_8$-$C_{30}$ APPENDED ALK(EN)YL

[75] Inventor: Virginia C. Marhevka, Maplewood, Minn.

[73] Assignee: 3M Innovative Properties Company, St. Paul, Minn.

[21] Appl. No.: 08/344,532

[22] Filed: Nov. 23, 1994

Related U.S. Application Data

[63] Continuation of application No. 08/082,609, Jun. 24, 1993, abandoned.

[51] Int. Cl.$^7$ .............................. C08L 63/02; C08L 67/02; C08L 67/06
[52] U.S. Cl. ............................ 525/438; 525/65; 523/466
[58] Field of Search ....................... 525/438, 65; 523/466

[56] References Cited

U.S. PATENT DOCUMENTS

| | | | |
|---|---|---|---|
| 4,243,705 | 1/1981 | Yapp et al. | 525/438 |
| 4,336,343 | 6/1982 | Aharoni | 525/439 |
| 4,707,535 | 11/1987 | Koleske | 528/110 |
| 4,933,252 | 6/1990 | Nishikawa et al. | 528/128 |
| 5,034,423 | 7/1991 | Blount | 528/409 |
| 5,218,018 | 6/1993 | Tominaga et al. | 525/438 |

OTHER PUBLICATIONS

Patent Abstracts of Japan, Patent No. 62–195678, Feb. 13, 1988.

Dewent Abstract No. 88–295990/42 for Japanese Patent No. 63–215732 published Sep. 8, 1988.

*Primary Examiner*—Robert E. Sellers
*Attorney, Agent, or Firm*—Robert W. Sprague; Brian E. Szymanski

[57] ABSTRACT

This invention comprises a two-part epoxy adhesive composition. The composition comprises an epoxy resin having an average epoxide functionality of greater than one and an oligomeric polyester which is on average, terminated by at least two hydroxyl groups.

5 Claims, No Drawings

ADHESIVE OF EPOXY RESIN AND OH-TERMINATED POLYESTER WITH C₈-C₃₀ APPENDED ALK(EN)YL

This is a continuation of application Ser. No. 08/082,609 filed Jun. 24, 1993, abandoned.

FIELD OF THE INVENTION

This invention relates to a thermally curable two-part epoxy composition. The invention also relates to an epoxy adhesive made from the epoxy composition.

BACKGROUND OF THE INVENTION

Epoxy compositions are known in the industry and have been used for various applications such as paints, coatings, and adhesives. Epoxy adhesives are especially useful as structural adhesives for bonding metal surfaces together. Structural epoxy adhesives have replaced spot welding and other methods of mechanical fastening in many industrial assembly processes. In many applications, the surface of the metal substrate is contaminated with a mill oil, a cutting fluid, a draw oil, or a combination of the aforementioned fluids. The oily metal surface may further be contaminated with dirt or dust commonly found in many factories or warehouses.

To obtain a strong structural bond with an adhesive, it is often necessary to clean or degrease the metal using organic solvents. The use of such solvents in the workplace is highly undesirable because of environmental damage as well as industrial hygiene concerns.

Adhesives are available which bond to oily metal surfaces. The state of the art adhesives provide adequate bonding when used in a situation where the bonded substrate is exposed to heat immediately. However, in some situations, the substrate is left at room temperature for a period of time before curing at an elevated temperature. In these situations, the adhesives generally do not build as high of a shear strength as desired. Additionally, the failure mode in these situations is an adhesive failure wherein the adhesive pulls cleanly away from one of the substrates, indicating poor adhesion. It is generally desirable to have structural adhesives fail in a cohesive mode wherein the adhesive splits and portions of the adhesive remain adhered to each of the bonded surfaces. A bond that fails cohesively at high shear values is referred to as being "robust".

One such situation exists in automotive assembly plants. Adhesives used to hold metal automobile panels together are spot cured by induction heating in several places to hold the panels in place, but a significant portion of the adhesive is left uncured at ambient temperature (approximately room temperature) until the vehicle is painted and run through a paint bake cycle to cure the paint and the adhesive. The vehicle can be left at ambient temperature for any amount of time from several minutes up to several days, depending upon when the vehicle is run through the paint bake cycle.

Various attempts have been made to formulate epoxy adhesives for oily metal surfaces. Co-pending U.S. application Ser. No. 07/900,607 describes an epoxy adhesive for oily metals. In this application, the epoxy adhesive is a two-part thermally curable composition having an epoxy resin, a substituted pentafluoroantimonic acid, a substituted aniline, a polyol, and a toughening agent. While having its own utility and specific benefits, the adhesive has not been seen to exhibit robust cohesive failures when cured partially at room temperature and fully cured in an oven.

U.S. Pat. No. 4,920,182 describes an epoxy adhesive composition having an epoxy resin, a radiation activated catalyst, and a flexible polyester having terminal carboxyl groups. The polyester is formed from an aliphatic polyol, cycloaliphatic polyol, or a mixture of such polyols, and an aliphatic, cycloaliphatic, or aromatic polycarboxylic acids, or a mixture of such acids, or the anhydride of an aliphatic dicarboxylic acid. The composition is used for bonding etched aluminum.

An epoxy adhesive composition that is capable of forming a durable, robust bond on oily metal with a delayed thermal cure is desired.

SUMMARY OF THE INVENTION

The present invention provides a novel epoxy adhesive composition that is capable of wetting out on oily metal surfaces to form a robust, structural bond, comprising:
(a) an epoxy resin having an average epoxide functionality of greater than one;
(b) an oligomeric polyester which is, on average, terminated by at least two hydroxyl groups and which is the reaction product of the starting materials comprising:
  i) a dicarboxylic acid or derivative thereof; and
  (ii) an aliphatic polyol, a cycloaliphatic polyol, an alkanol substituted arene polyol, or a mixture of two or more of the foregoing, the polyol having from about 3 to 10 carbon atoms and at least two hydroxyl groups being primary or secondary; and
(c) a catalytically effective amount of an acid catalyst.

Preferably, the adhesive composition further includes a toughening agent compatible with the epoxy composition.

The present invention also comprises an article comprising the adhesive composition coated onto a substrate.

Additionally, the present invention comprises applying the adhesive composition of the present invention onto a substrate.

DETAILED DESCRIPTION

Epoxides that are useful in the composition of the present invention can be any organic compound having at least one oxirane ring that is polymerizable by ring opening. The epoxide useful in the present composition preferably has an average epoxy functionality greater than one, and more preferably, at least two. The epoxides can be monomeric or polymeric, and aliphatic, cycloaliphatic, heterocyclic, aromatic or mixtures thereof. The preferred epoxides are aromatic and contain more than 1.5 epoxy groups per molecule and preferably more than 2 epoxy groups per molecule.

The useful materials have a molecular weight of about 150 to 10,000 and preferably from about 300 to 1,000. Useful materials include linear polymeric epoxides having terminal epoxy groups (e.g., a diglycidyl ether of a polyoxyalkylene glycol), polymeric epoxides having skeletal epoxy groups (e.g., polybutadiene polyepoxy), and polymeric epoxides having pendant epoxy groups (e.g., a glycidyl methacrylate polymer or copolymer), and mixtures thereof.

Useful epoxide containing materials include compounds represented by the general Formula I:

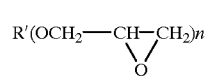

I wherein:
R' is alkyl, alkyl ether, or aryl, preferably aryl and n is an integer between 2 and 6.

Preferred epoxide containing materials are aromatic glycidyl ethers such as those prepared by reacting a polyhydric phenol with an excess of epichlorohydrin. Examples of useful polyhydric phenols include resorcinol, catechol, hydroquinone, and the polynuclear phenols including p,p'-dihydroxydibenzyl, p,p'-dihydroxydiphenyl, p,p'-dihydroxydiphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylmethane, dihydroxydiphenyltolylmethylmethane, dihydroxydiphenyldicyclohexylmethane, and dihydroxydiphenylcyclohexane. Also preferred are polyhydric phenolic formaldehyde condensation products as well as polyglycidyl ethers that contain as reactive groups only epoxy groups or hydroxy groups.

Other preferred epoxide containing materials include diglycidyl ethers of bisphenol A, bisphenol F and of novolak resins, such as described in "Handbook of Epoxy Resins" by Lee and Nevill, McGraw-Hill Book Co., New York (1967), incorporated herein by reference. Epoxides with flexibilized backbones are also useful. The preferred epoxide containing materials attain the desirable structural adhesive properties upon curing. Examples of commercially available epoxide containing materials useful in the invention include diglycidyl ethers of bisphenol A (e.g., those sold under the trademarks Epon 828, Epon 1001, and Epon 1310 and commercially available from Shell Chemical Co., and DER-331, DER-332, and DER-334 commercially available from Dow Chemical Co.); diglycidyl ethers of bisphenol F (e.g., Epiclon™830 commercially available from Dai Nippon Ink and Chemicals Inc.); silicone resins containing diglycidyl epoxy functionality; flame retardant epoxy resins (e.g., DER 580, a brominated bisphenol type epoxy resins available from Dow Chemical Co.); and 1,4-butanediol diglycidyl ethers.

Epoxide containing materials represented by general Formula I above and having n equal to one can optionally be utilized as additives in the composition of the instant invention.

The oligomeric polyester(s) useful in the curable epoxy composition is terminated by at least one hydroxyl group and is formed from the reaction product of an aliphatic polyol, a cycloaliphatic polyol, an alkanol substituted arene polyol, or a mixture of two or more of the foregoing, and a dicarboxylic acid or a dicarboxylic acid derivative. Preferably, the polyester is terminated by at least two hydroxyl groups. The polyester oligomer is also referred herein in this application as an adduct.

Preferably, the carboxylic acid or acid derivative comprises a moiety of about 1 to about 10 carbon atoms linking the carboxyl groups. The carboxylic acid or derivative thereof preferably has an appended alkyl or alkenyl group comprising from about 8 to about 30 carbon atoms. More preferably, the appended alkyl or alkenyl group comprises about 12 to about 24 carbon atoms and most preferably, the appended group comprises 16 to 20 carbon atoms.

Suitable dicarboxylic acids include succinic acid, glutaric acid, phthalic acid, adipic acid, malonic acid and maleic acid which preferably have an appended alkyl or alkenyl group comprising from about 8 to about 30 carbon atoms. More preferably, the appended alkyl or alkenyl group comprises about 12 to about 24 carbon atoms and most preferably, the appended group comprises 16 to 20 carbon atoms.

Useful derivatives of dicarboxylic acids include acid halides and cyclic anhydrides having at least one anhydride group per molecule and an appended alkyl or alkenyl group of about 8 to about 30 carbon atoms. More preferably, the appended alkyl or alkenyl group comprises about 12 to about 20 carbon atoms and most preferably, the appended group comprises 16 to 20 carbon atoms.

An example of a useful dicarboxylic acid halide includes octadecenyl succinyl chloride.

Preferred are cyclic anhydrides having appended alkyl or alkenyl groups with 8 to 30 carbon atoms, more preferred are groups with 12 to 24 carbon atoms, and most preferred are groups with 16 to 20 carbon atoms. Examples of useful anhydrides include maleic anhydride, succinic anhydride, glutaric anhydride, and phthalic anhydride having the required substituent. Specific examples include octenyl succinic anhydride and octadecenylsuccinic anhydride. The foregoing anhydrides may be used singly or in combination as mixtures in the invention.

The polyols which can be utilized in the present invention preferably comprise from about 3 to about 10 carbon atoms and have at least two hydroxy groups that are primary or secondary (i.e., or at least two primary hydroxy groups, at least two secondary groups, or at least one primary group and at least one secondary group). Preferably, the polyol comprises at least three hydroxy groups with at least one hydroxy group, preferably at least two hydroxy groups, being primary. More preferably, the polyols have 4 to 8 carbon atoms. As used herein, the term "alkanol-substituted arene polyol" refers to arene structures which are substituted with at least two alkanol groups, typically methanol. Additionally, the term "arene" as utilized herein refers to hydrocarbons containing at least one aromatic ring, e.g. benzene, biphenyl, etc. The polyol preferably is free of amine groups, electron-withdrawing substituents that will react with the curing agent such cyano, $-SCH_3$, $-SO$, $-SO_2$, and $SO_3$, and large groups that cause steric hinderance in the alpha position in relation to the carbon attached to the methylol group of the polyol.

Examples of useful polyols include alkylene glycols, such as 1,3-propanediol, 1,4-butanediol, 1,6-hexanediol, 1,4-cyclohexanedimethanol, 1,8-octanediol, and polyhydroxyalkanes, such as glycerol, trimethylolethane, trimethylolpropane, 1,2,6-trihydroxyhexane, pentaerythritol, and sorbitol, and blends thereof. Other examples of useful polyols are disclosed in U.S. Pat. No. 4,503,211 herein incorporated by reference. Examples of preferred polyols include 1,6-hexanediol, diethylene glycol, 1,5-pentanediol, 1,4-cyclohexanedimethanol, trimethylolpropane and blends thereof.

The polyol and anhydride are reacted together in an amount sufficient to provide an anhydride to hydroxy equivalents ratio of greater than 1:1 and up to about 1:20. Preferred equivalents ratios are between about 1:2 and about 1:10. Most preferably the equivalents ratios are between about 1:4 and about 1:6.

In the practice of the invention, the anhydride and the polyol are reacted together in the presence of an acid catalyst at elevated temperatures in an amount to provide an adduct having the desired hydroxy to anhydride equivalents ratio. The adduct is a low molecular weight, hydroxy terminated polyester oligomer. The number of monomer units in the oligomer is preferably less than 20, and most preferably less than 10.

It is preferred to have excess polyol in the formation of the oligomer so the reacted mixture also contains polyol that is not reacted with an anhydride. The polyol and polyester are preferably present in an amount sufficient to provide a hydroxy to epoxy ratio (OH/Epoxy ratio) in the composition between about 0.1:1 and 1.5:1, more preferably 0.25:1 to 1:1, and most preferably 0.4:1 to 0.9:1.

Although not wishing to be bound by any theory, it is theorized that the adduct provides longer chains of polyols which helps to prevent excessive crosslinking of the epoxide during curing. The lower crosslink density during curing and the long aliphatic side chains help the epoxy adhesive to penetrate the oily surface and wet out the metal surface and form a stronger bond between the adhesive and the metal. It is also believed that the adduct mixture promotes absorption of the oil into the adhesive layer which helps to plasticize and flexibilize the epoxy adhesive.

The curing agents useful in the present invention are Lewis acid or Bronsted acid catalysts that are typically used to catalyze epoxy crosslinking reactions. Examples of useful catalysts are Lewis acid compounds, such as $BF_3$ amine complexes, $SbF_6$ sulfonium compounds, bisarene iron complexes, and Bronsted acid compounds, such pentafluoroantimonic acid amine complexes.

A preferred catalyst is the reaction product of a substituted pentafluoroantimonic acid and a substituted benzene comprising an amino substituent and at least one electron withdrawing substituent. The mole ratio of the substituted benzene to the pentafluoroantimonic acid is from about 1.05:1 to about 4:1.

Most preferably, the catalyst is a substituted pentafluoroantimonic acid with an aminobenzoic acid or a low molecular weight ester of aminobenzoic acid. The substituted pentafluoroantimonic acid is represented by the following formula:

$$H^+SbF_5X^-$$   II wherein X is a halogen, a hydroxy, or an —OR group and wherein —OR is the residue of an aliphatic or aromatic alcohol. Preferably, the aliphatic or aromatic alcohol has a molecular weight of from about 32 to about 100,000, and a primary or secondary hydroxyl functionality of at least 1 and more preferably, at least 2. An example of a preferred alcohol is diethylene glycol.

The substituted benzene useful in the practice of the invention comprises an amino substituent and at least one electron-withdrawing substituent. Preferred electron withdrawing substituents include carboxyl, $C_1$–$C_4$ alkyl carboxylate, halogen, and nitro. Electron-withdrawing substituents such as cyano, —$SCH_3$, —SO, —$SO_2$, and $SO_3$ are generally not suitable since they will react with the curing agent. Preferred substituted benzenes include aminobenzoic acids or low molecular weight esters of aminobenzoic acids. Examples include 4-aminobenzoic acid, and the $C_1$–$C_4$ alkyl esters thereof.

The acid portion of the curing agent is used in a catalytically effective amount in the practice of the present invention. The amount of curing agent generally will range from about 0.10 to about 8 parts by weight per 100 parts of the total amount of epoxide used. Preferably, the curing agent will be present in an amount of about 0.5 to about 4 parts by weight and most preferably, about 1 to about 2 parts by weight per 100 parts of the total amount of epoxide used.

The epoxy adhesive composition preferably includes a polymeric toughening agent. Useful toughening agents have an epoxide incompatible component substantially insoluble in the epoxy resin and an epoxide compatible component substantially soluble in epoxy resin. It is important that the toughening agent contains no functional groups which would poison the curing agent such as those indicated as not being desirable substituents in the substituted benzene.

The toughening agents which are useful in the present invention include polymeric compounds having both a rubbery phase and a thermoplastic phase, such as: (1) graft copolymers having a polymerized diene rubbery core and a polyacrylate or polymethacrylate shell; (2) graft copolymers having a rubbery core with a polyacrylate or polymethacrylate shell; and (3) elastomeric particles polymerized in situ in the epoxide containing materials from free-radical polymerizable monomers and a copolymeric stabilizer.

Specific examples of useful toughening agents include graft copolymers having a polymerized diene rubbery backbone or core which is grafted to a shell of an acrylic acid ester or methacrylic acid ester, monovinyl aromatic hydrocarbon, or a mixture thereof, such as disclosed in U.S. Pat. No. 3,496,250, incorporated herein by reference. Preferable rubbery backbones comprise polymerized butadiene or a polymerized mixture of butadiene and styrene. Preferable shells comprising polymerized methacrylic acid esters are lower alkyl ($C_1$–$C_4$) substituted methacrylates. Preferable monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature ($T_g$) below about 0° C., such as polybutyl acrylate or polyisooctyl acrylate to which is grafted a polymethacrylate polymer (shell) having a $T_g$ about 25° C. such as polymethylmethacrylate.

Still further examples of toughening agents useful in the invention are elastomeric particles that have a $T_g$ below about 25° C. and have been polymerized in situ in the epoxide before mixing with the other components of the composition. These elastomeric particles are polymerized from free-radical polymerizable monomers and a copolymerizable polymeric stabilizer that is soluble in the epoxide. The free-radical polymerizable monomers are ethylenically unsaturated monomers or diisocyanates combined with co-reactive difunctional hydrogen compounds such as diols, diamines, and alkanolamines. Examples of these elastomeric particles are disclosed in U.S. Pat. No. 4,525,181. These particles are commonly referred to as "organosols".

Still other toughening agents are rubber modified liquid epoxy resins. An example of such a resin is Kraton™ RP6565 Rubber available from Shell Chemical Company. The modified epoxy resin is made from 85% by weight Epon™ 828 and 15% by weight of a Kraton™ rubber. The Kraton™ rubbers are known in the industry as elastomeric block copolymers.

The toughening agent is preferably used in an amount equal to about 3 to 35 parts by weight, and more preferably about 5 to 15 parts by weight per 100 parts by weight of the epoxy resin. The toughening agents of the present invention add strength to the composition after curing without reacting with the epoxide or without interfering with curing.

In some cases reactive diluents may be added to control the-flow characteristics of the adhesive composition. Suitable diluents have at least one reactive terminal end portion and preferably, a saturated or unsaturated cyclic backbone. Preferred reactive terminal ether portions include glycidyl ether and vinyl ether. Examples of suitable diluents include the diglycidyl ether of resorcinol, diglycidyl ether of cyclohexane dimethanol, diglycidyl ether of neopentyl glycol, triglycidyl ether of trimethylolpropane dipentene, and the divinyl ether of cyclohexanedimethanol. Commercially available reactive diluents are "WC-68" from Rhone Poulenc, and Rapicure™ CHVE, a divinyl ether of cyclohexanedimethanol available from Allied-Signal Corp. of Morristown, N.J.

Various other adjuvants can be added to the epoxide composition to enhance properties of the composition before and after curing.

A useful group of adjuvants to enhance adhesion to metals are polyhydroxy benzene carboxylic acids such as gallic acid, digallic acid, and tannic acid. Tannic acid is available from Mallinckrodt, Inc.

Also included among useful adjuvants are nonreactive diluents; plasticizers such as conventional phosphates and phthalates; thixotropic agents such as fumed silica to provide flow control; pigments to enhance color tones such as ferric oxide, brick dust, carbon black, and titanium dioxide; fillers such as talc, silica, calcium carbonate, calcium sulfate, beryllium aluminum silicate; clays such as bentonite; glass and ceramic beads and bubbles; and reinforcing materials, such as woven and nonwoven webs of organic and inorganic fibers such as polyester, polyimide, glass fibers, and ceramic fibers. The adjuvants can be added in an amount effective for the intended purpose; typically, amounts up to about 50 parts of adjuvant per total weight of formulation can be used.

The epoxy composition of the present invention may be formulated in a variety of ways. By providing a two-part composition, with the two parts being combined prior to use of the composition, desirable shelf-life or pot-life of the composition is obtained. In some applications, it is desirable to select the amounts and the distribution of the ingredients in each part to provide viscosity control and better mixing of the two parts. For example, the fillers can be divided so that each part contains a portion of the fillers used.

The epoxy compositions of the present invention can be cured by any means which allow sufficient heat to start the curing reaction. The means can include conventional ovens, induction heating, infrared radiation, microwave radiation, immersion into liquid baths, or any combination thereof. Typically, the final curing is conducted at a temperature in the range of about 50° C. to about 200° C. for a time ranging from about 1 second to about 2 hours. The curing time will depend upon the particular process for curing. Induction heating times typically range from about 1 to about 60 seconds while oven curing times can range from about 0.1 to about 2 hours.

The epoxy composition of the present invention is particularly useful in adhesive applications wherein the adhesive is applied to oily metal substrates and the substrates are left at room temperature for a time before final curing. The composition is also useful in applications in which the adhesive is spot cured by induction coils, held for a period of time at room temperature, and then cured in a conventional oven at temperatures of about 177° C. for 30 minutes.

The epoxy adhesive of the present invention can be used for bonding metal to metal, plastic to plastic, and plastic to metal. Examples of metal surfaces include steel, titanium, oily steel, aluminum, and magnesium. Plastic surfaces include polyethylene, polycarbonate, polyester, polyurethane, and ureaformaldehyde. The epoxy adhesive can be used in assembling parts for automobiles, aircraft, refrigeration units, etc.

The following non-limiting examples serve to further illustrate the present invention in greater detail.

Test Procedures

T-Peel Adhesion Test

Two strips of steel which meet ASTM Test Method A619/A619M-82 and measure 25.4 mm by 203 mm by 0.8 mm are degreased with acetone. One surface of each strip is coated first with 61-AUS mill oil (available from Quaker State) with a #5 draw bar, and then EDC-0002™ automotive draw oil (available from Metal Lubricants Co. of Harvey, Ill.) is coated over the mill oil with a #10 draw bar. The coated strip is then allowed to dry for about 1 hour at room temperature. The epoxy adhesive composition being tested is applied to the oiled surfaces of each steel strip and glass beads sold under the tradename "Microbead™ 1402 Class IV Engineering Grade" available from Cataphote, Inc which comprise approximately 0.5% to 1% by weight of the adhesive composition are sprinkled uniformly on the adhesive of one of the strips. The beads measure between 0.0232 to 0.0164 inch (0.589 to 0.417 mm). The other strip is then placed over the first strip with the adhesive coated surfaces facing each other. The strips are clamped together and placed in a forced air oven at 176.7° C. for 30 minutes until the adhesive is cured. The laminated strips are then conditioned at about 21° C. for at least two hours. The peel strength is measured using a tensile tester according to ASTM Test Method 1876-72 with the strips being pulled apart at a crosshead speed of 50 cm per minute. The T-peel is measured in Newtons per centimeter and the mode of failure is noted as: (1) adhesive ("A") wherein the adhesive pulls cleanly away from the steel strip; (2) cohesive ("C") wherein the adhesive splits leaving adhesive on each of the coated strips and at least 50% of the adhesive coated surface area of the strips fails cohesively; or (3) mixed ("M"), wherein both modes of failure are observed and cohesive failure occurs in less than 50% of the adhesive coated surface area.

Lap Shear Strength

This test measures the shear strength that an epoxy adhesive composition will achieve after it is cured at various conditions indicated below. The lap shear strength is also referred to a the "overlap" shear strength.

Sheets of 0.76 mm thick hot dipped extra smooth galvanized steel sold under the tradename G60-OHDES from the National Steel Corporation, Livonia, Mich. are cut into 25.4 mm by 76.2 mm test coupons and degreased with acetone. The bonding surfaces of two coupons are coated with 61-AUS mill oil with a #5 draw bar, and EDC-0002 oil is coated on the mill oil using a #8 draw bar. The coupons are then placed oiled side up and allowed to dry for at least two hours at 21° C. The epoxy adhesive composition being tested is spread over one end of the first oiled coupon. "Microbead™ 1402 Class IV Engineering Grade" beads weighing approximately 0.5% to 1% by weight percent of the adhesive composition are sprinkled uniformly over the adhesive surface. The oiled surface of the other coupon is placed over the adhesive such that there is a 12.7 mm overlap of the coupons and the uncoated ends of the coupons are aligned in opposing directions from each other. The coupons are clamped together and cured at various test conditions shown below. The cured samples are conditioned for at least two hours at 21° C. before testing. The lap shear is determined using a tensile tester according to ASTM Test Method D1002-72 with a crosshead speed of 5 cm/min. The lap shear is reported in units of megaPascals (MPA). The failure mode is also noted as described in the T-peel test. It is desirable to have cohesive failure as the failure mode. Five independent samples involving a particular epoxy adhesive composition are tested and the results are averaged.

Curing conditions used were as follows:

Cond A—Cured in an oven at 176.7° C. for 30 minutes.
Cond B—Cured at 21° C. for 24 hours.
Cond C—Cured at 21° C. for 24 hours and then cured in an oven at 176.7° C. for 30 minutes.

If compositions were not cured, they were designated as wet.

Identification of Components Used in The Examples

The following components were utilized in the examples and comparative examples:

"B37/2000" glass bubbles—glass bubbles available from Minnesota Mining & Manufacturing Company;

Cab-O-Sil™ TS-720 silica—fumed silica available from Cabot Corp;

CHDM—1,4-cyclohexanedimethanol having a molecular weight of 144 and available from Eastman Chemical;

Epon™ 828 Epoxy Resin—diglycidyl ether of Bisphenol A having an epoxy equivalent weight of about 190 and an average molecular weight of 350–400 and available from Shell Chemical Company;

"GP-7I" silica—amorphous silicon dioxide having a particle size range from about 20–30 micrometers, available from Harbison-Walker Corp;

GLY—glycerol available from Henkel Corporation;

HDO—1,6-hexanediol having a molecular weight of 118 and available from BASF;

ODSA—octadecenylsuccinic anhydride having an average molecular weight of 350 and available from Milliken Chemical Corporation;

OSA—octenylsuccinic anhydride having an average molecular weight of 210 and available from the Milliken Chemical Corporation;

PABA—4-aminobenzoic acid available from National Starch and Chemical Company;

Paraloid™ BTA III N2 copolymer—methyl methacrylate/butadiene/styrene copolymer available from Rohm & Haas Company;

Tannic Acid—naturally occurring compound of gallic acid and glucose and glucose oligomers available from Mallinckrodt Specialty Chemical Company;

TMP—Trimethylolpropane having a molecular weight of 134.2 and available from Hoechst Celanese; and "WC-68 Reactive Diluent"—diglycidyl ether of neopentyl glycol having an epoxy equivalent weight of about 135, available from Rhone-Poulenc.

Preparation of Two-part Composition

Part A comprising acid catalyst and anhydride-polyol adduct was combined with Part B which comprised the epoxy premix. The preparation of the components of Part A and Part B are described below.

Preparation of the Acid Catalyst Complex (Part A)

The catalyst complex ($SbF_5$/DEG—antimony pentafluoride diethylene glycol) was prepared by slowly adding 21.7 grams (0.1 mole) antimony pentafluoride (available from Allied Signal) into 21.7 grams (0.2 mole) diethylene glycol that had been cooled to approximately 5° C. with constant stirring over about a 10 minute period. The mixture was allowed to warm to 21° C. and stored for future use.

Preparation of Anhydride-polyol Adduct/Curing Mixture (Part A)

The anhydride and the polyol, both in a molten state, were charged to a 1000 ml reactor flask fitted with a nitrogen inlet, stirring shaft with a four blade propeller stirrer and a Dean-Stark trap fitted with a water cooled Allihn condenser. The particular polyols, anhydrides, and the equivalents of each were varied as shown in the Table 1. The equivalents ratios are also shown. The acid catalyst complex described above was added to the molten anhydride/polyol mixture at a concentration of 0.1% by weight of the total batch size. The mixture was brought to a temperature of about 130° C. and held at that temperature for 30 minutes to form the adduct. After 30 minutes, the adduct mixture was distilled at reduced pressure (−28 inches Hg or 49 torr) to remove the residual water of reaction.

The curing mixture was prepared by dissolving the amine (PABA) in the adduct mixture at about 100° C. When tannic acid was used, it was also dissolved in the adduct mixture with the amine at 100° C. After cooling to about 21° C. the acid catalyst complex was added to the mixture to form PART A of the two-part epoxy formulation. Fillers, when used in Part A, were added o the cooled mixture.

TABLE 1

| OLIGOMER ADDUCT | ANHYDRIDE/ EQUIVALENTS | POLYOL/ EQUIVALENTS | ANHYDRIDE: HYDROXY EQUIVALENTS RATIO |
|---|---|---|---|
| I | ODSA/1.43 | HDO/7.14 | 1:5 |
| II | ODSA/1.43 | HDO/14.3 | 1:10 |
| III | ODSA/1.43 | HDO/1.43 | 1:1 |
| IV | OSA/2.38 | HDO/11.9 | 1:5 |
| V | OSA/0.71 | HDO/7.1 | 1:10 |
| VI | ODSA/1.53 | CHDM/1.53 | 1:1 |
| VII | ODSA/1.14 | CHDM/5.71 | 1:5 |
| VIII | ODSA/0.57 | CHDM/5.71 | 1:10 |
| IX | ODSA/1.07 | HDO/4.95 CHDM/0.45 | 1:5 |
| X | ODSA/1/07 | HDO/4.28 CHDM/1.13 | 1:5 |
| XI | ODSA/1.07 | HDO/3.0 CHDM/2.4 | 1:5 |
| XII | ODSA/0.99 | HDO/4.97 TMP/0.76 | 1:5 |
| XIII | ODSA/0.99 | HDO/4.97 TMP/2.14 | 1:5 |
| XIV | ODSA/0.99 | HDO/4.0 TMP/5.31 | 1:5 |
| XV | ODSA/1.03 | HDO/4.9 GLY/1.0 | 1:5 |
| XVI | ODSA/1.03 | HDO/4.39 GLY/2.74 | 1:5 |
| XVII | ODSA/1.03 | HDO/3.31 GLY/6.26 | 1:5 |

Preparation of Epoxy Composition Premix (Part B)

An epoxy composition premix for the following examples was prepared by mixing 73.4 parts Epon™ 828 epoxy resin, 15.8 parts Paraloid™ BTAIII N2 core shell copolymer, and 10.4 parts WC-68 Reactive Diluent to make 100 parts of premix. The mixture was stirred with a high shear mixer at about 115° C. for one hour and then cooled to about 21° C. Fillers, when used, were added to the cooled mixture, or as specified in the examples. All amounts are listed in parts by weight unless otherwise indicated.

EXAMPLE 1

An anhydride/polyol adduct mixture was prepared according to the above-described procedure using 250.25 grams (1.43 equivalents) of ODSA and 421.3 grams (7.14 equivalents) of HDO.

Part A of a two part epoxy adhesive composition was prepared according to the abovedescribed procedure using 13.4 parts of the adduct (Oligomer I), 0.7 parts PABA, 1.1 parts acid catalyst complex described above and 0.5 parts of tannic acid.

An epoxy adhesive composition was prepared by mixing all of PART A and 37.6 parts of PART B (preparation described above). This mixing ratio provided on OH/Epoxy ratio of 0.6:1. After mixing, the fillers comprising: (1) 15.9 parts "GP-7I" silica, (2) 3.2 parts "B37-2000" glass bubbles and (3) 1.33 parts Cab-O-Sil™ TS-720 silica were added and mixed thoroughly. The adhesive composition was tested according to the above-described test procedures. The test results are reported below in Table 2.

EXAMPLE 2

An anhydride-polyol adduct was prepared according to the above-described procedure by mixing 50 grams ODSA, 77.4 grams HDO, and 0.18 grams acid catalyst complex described above. The mixture was brought up to a temperature of 130° C. and maintained at 130° C. for an hour. Residual water was removed by vacuum distillation and the mixture was cooled to room temperature.

Part A was prepared according to the abovedescribed procedures. Part A comprised 13.44 parts ODSA/HDO adduct mixture, 0.5 parts tannic acid, 0.7 parts PABA, 1.1 parts acid catalyst complex ($SbF_5$/DEG), 5.3 parts "GP-7I" silica, 2.46 parts "B37-2000" glass bubbles, and 0.67 parts Cab-O-Sil™ TS-720 silica.

Part B was prepared by mixing 37.6 parts of the epoxy composition premix described above with 10.63 parts "GP-7I" silica, 0.73 parts "B37-2000" glass bubbles, and 0.66 parts Cab-O-Sil™ TS-720 silica.

An epoxy adhesive composition was prepared by mixing one part by PART A and two parts of PART B by weight. The adhesive composition had an OH/Epoxy ratio of 0.6:1. The composition was cured and tested as in Example 1. The test results are reported in Table 2.

COMPARATIVE EXAMPLE C1

Part A was prepared by mixing 3.2 parts of HDO, 3.2 parts CHDM, 0.5 parts tannic acid, 0.7 parts of PABA, at 100° C. until the PABA and tannic acid were dissolved. The mixture was cooled to about 20° C., and 1.1 parts of $SbF_5$/DEG, 5.3 parts "GP-7I" silica, 2.46 parts "B37-2000" glass bubbles, and 0.67 parts Cab-O-Sil™ TS-720 silica were added and mixed.

Part B was prepared by mixing 37.6 parts of the epoxy composition premix described above with 10.63 parts "GP-7I" silica, 0.73 parts "B37-2000" glass bubbles, and 0.66 parts Cab-O-Sil™ TS-720 silica.

An epoxy adhesive composition was prepared by mixing equal parts by volume of Part A and Part B. The adhesive composition had an OH/Epoxy ratio of 0.6:1. The composition was cured and tested as in Example 1 and test results are shown in Table 2.

COMPARATIVE EXAMPLE C2

PART A of an epoxy adhesive composition was prepared as in Example C1 except using 6.37 parts HDO and no CHDM.

An epoxy adhesive composition was prepared using all of PART A, 37.6 parts of epoxy composition premix (PART B) prepared according to the procedure described above, 13.88 parts "GP-7I" silica, 2.78 parts "B37-2000" glass bubbles, and 1.16 parts Cab-O-Sil™ TS-720 silica. The adhesive was cured and tested as in Example 1 and test results are shown in Table 2.

COMPARATIVE EXAMPLE C3

PART A was prepared by mixing 5.29 parts HDO and 3.3 parts ODSA which were utilized to dissolve the 0.7 parts PABA and 0.5 parts at 100° C. tannic acid. After cooling, 1.1 parts of acid catalyst complex were added as described above.

An epoxy adhesive composition was prepared using all of PART A, 37.6 parts of the epoxy composition premix (PART B) prepared according to the procedure described above, 14.51 parts "GP-7I" silica, 2.9 parts "B37-2000" glass bubbles, and 1.21 parts Cab-O-Sil™ TS-720 silica. The adhesive was cured and tested as in Example 1 and test results are shown in Table 2.

TABLE 2

| EX | ADDUCT MIX/ AMOUNT IN PARTS | FILLER AMOUNTS - PARTS | | | LAP SHEAR STRENGTH - MPA/FAIL MODE | | | T-PEEL N/cm |
|---|---|---|---|---|---|---|---|---|
| | | "GP-7I" silica | Glass Bubbles | TS-720 silica | COND A | COND B | COND C | |
| 1 | I/13.2 | 15.9 | 3.2 | 1.33 | 15.0/C | 11.6/A | 14.8/C | 66 |
| 2 | I/13.2 | — | — | — | 15.2/C | 10.0/A | 14.5/C | 65 |
| C1 | — | — | — | — | 15.2/C | 2.4/A | 11.7/A | 44 |
| C2 | — | — | — | — | 15.6/C | 2.9/A | 4.1/A | 26 |
| C3 | — | — | — | — | 13.7/C | .002/A | 1.3/A | — |

The test results in Table 2 show that the epoxy adhesive compositions of the invention have superior Lap Shear strengths as compared to comparable adhesives made without the adduct or with ODSA that has not been pre-reacted to form the adduct.

EXAMPLES 3–16

Epoxy adhesive compositions were prepared and tested as described in Example 1 except different anhydrides and polyols and amounts thereof were used. The oligomer adduct and the amounts of the oligomer adduct are reported in Table 3.

The other components utilized in Examples 3–16 were kept constant. The components utilized and amounts thereof comprised: the acid catalyst complex—1.1 parts; PABA—0.7 parts; Tannic Acid—0.5; and Part B—37.6 parts.

The fillers added to the composition were adjusted such that the total amount of filler was about 27.8% of the total composition by weight and the percentage of each filler was kept at about a constant percentage of the total amount of filler. The fillers utilized and amounts thereof were: "B37/2000" glass bubbles—78%; Cab-O-Sil™ TS-720 silica—15.5%; and "GP-7I" silica—6.5%. The filler, the specific amounts of filler together with the test results are also reported in Table 3.

COMPARATIVE EXAMPLE C4–C5

The examples were prepared with adducts having an anhydride/hydroxy equivalents ratio of 1:1. C4 was prepared in accordance with the procedures outlined in Examples 1 and 3 except that that a 1:1 anhydride/hydroxy equivalents ratio was utilized. C5 was prepared in accordance with the procedures outlined in Examples 4 and 5 except that a 1:1 anhydride/hydroxy equivalents ratio was utilized.

TABLE 3

| EX | ADDUCT MIX/ AMOUNT IN PARTS | FILLER AMOUNTS - PARTS | | | LAP SHEAR STRENGTH - MPA/FAIL MODE | | | T-PEEL N/cm |
|---|---|---|---|---|---|---|---|---|
| | | "GP-7I" silica | Glass Bubbles | TS-720 silica | COND A | COND B | COND C | |
| 3 | II/9.2 | 14.73 | 2.95 | 1.23 | 15.4/C | 8.7/C | 12.3/M | 53 |
| C4 | III/25.3 | 19.6 | 3.9 | 1.63 | 5.7/A | 0/A | 0/A | 4 |
| 4 | IV/11.58 | 15.44 | 3.09 | 1.29 | 14.5/C | 2.6 | 6.8/A | 54 |
| 5 | V/9.64 | 14.86 | 2.97 | 1.24 | 15.6/C | 4.5 | 11.5/M | 60 |
| C5 | VI/26.67 | 19.97 | 3.89 | 1.69 | 7.10/A | 8/A | .81/A | 30 |
| 6 | VII/14.4 | 16.3 | 3.26 | 1.36 | 13.8/C | 3.1/A | 12.7/M | 42 |
| 7 | VIII/8.58 | 14.54 | 2.91 | 1.21 | 12.8/C | 1.5/A | 9.9/M | 42 |
| 8 | IX/12.86 | 15.83 | 3.16 | 1.32 | 14.0/C | 3.3/M | 12.3/M | 57.5 |
| 9 | X/13.13 | 15.91 | 3.18 | 1.33 | 14.0/C | 3.5/M | 12.9/M | 56 |
| 10 | XI/13.23 | 15.94 | 3.19 | 1.33 | 15.2/C | 3.6/A | 10.9/A | 51 |
| 11 | XII/13.69 | 16.1 | 3.22 | 1.34 | 13.1/C | 9.51/A | 12.9/C | 72 |
| 12 | XIII/15.21 | 16.53 | 3.31 | 1.38 | 11.0/C | 7.25/A | 10.7/C | 59 |
| 13 | XIV/17.75 | 17.3 | 3.46 | 1.44 | 7.31/C | 1.38/A | 8.0/C | 34 |
| 14 | XV/13.12 | 15.91 | 3.18 | 1.33 | 12.8/C | WET | 13.0/C | 63 |
| 15 | XVI/13.8 | 16.11 | 3.22 | 1.34 | 12.5/C | WET | 9.00/C | 57 |
| 16 | XVII/14.9 | 16.44 | 3.29 | 1.37 | 12.1/C | WET | 10.5/C | 39 |

The data in Table 3 show that the preferred components can be formulated to provide epoxy adhesive compositions having robust failures.

EXAMPLE 17

An adhesive composition was prepared by dissolving 0.5 parts PABA, and 1.1 parts acid catalyst described above (SbF$_5$/DEG) in 13.2 parts of anhydride/polyol adduct mixture II, and then mixing the mixture with 34.2 parts Epon™828. The OH/Epoxy ratio was 0.6:1. The adhesive was tested according to the above-described Lap Shear Test procedure for Cond C.

Test results are shown in Table 4.

COMPARATIVE EXAMPLES C6–C7

Adhesive compositions for C6 and C7 were prepared in accordance with the procedures described in Example 17 except that 6.4 parts HDO were utilized in C6 and 6.4 parts HDO and 3.8 parts of ODSA were utilized in C7 instead of the adduct described above which was heated to 70° C. This temperature was sufficient to melt the compounds, but was not high enough to esterify the compounds to form the adduct. The catalyst and PABA were added to the mixture and the mixture was combined with 34.2 parts of Epon™828. The OH/Epoxy ratio for both comparative examples was 0.6:1. Test results are shown in Table 4.

TABLE 4

| Example | Lap Shear Strength - MPA Cond C | Failure Mode |
|---|---|---|
| 17 | 11.24 | C |
| C6 | 4.48 | A |
| C7 | * | — |

*Mixture exothermed violently on mixing the catalyst with the epoxy so bonds could not be made.

The data in Table 4 show that the adduct can be used in a straight epoxy formulation to form robust adhesive bonds on oily metals.

EXAMPLE 18

An epoxy adhesive composition of the present invention was prepared for in the following manner. Part A was prepared according to the procedures described above using 13.69 parts of oligomer adduct XII, 0.5 parts tannic acid, 0.77 parts PABA, 1.1 parts acid catalyst complex (SbF$_5$/DEG), 5.3 parts GP-7I TS 720 silica, 1.25 parts B37/2000 glass bubbles and 0.67 parts Cab-O-Sil TS 720 silica.

Part B of the composition was prepared with 37.6 parts epoxy composition premix made in accordance with the procedures described above, 10.46 parts GP-7I silica, 1.91 parts B37/2000 glass bubbles and 0.66 parts Cab-O-Sil TS 720 silica.

Parts A and B were then mixed together in a 1:1 volume ratio to make the adhesive composition.

In summary, novel adhesive compositions have been described. Although specific embodiments and examples have been disclosed herein, it should be borne in mind that these have been provided by way of explanation and illustration and the present invention is not limited thereby. Certainly, modifications which are within the ordinary skill in the art are considered to lie within the scope of this invention as defined by the following claims and all equivalents.

I claim:

1. An epoxy adhesive composition comprising:
   (a) a major amount of an epoxy resin having an average epoxide functionality of greater than one;
   (b) an oligomeric polyester which is, on average, terminated by at least two hydroxyl groups and which is the reaction product of starting materials comprising:
      (i) a dicarboxylic acid, a dicarboxylic acid derivative or a mixture of one or more of the foregoing, each comprising a moiety linking the carboxyl groups thereof separating the carboxyl groups by about one to about ten carbon atoms and each further comprising an appended alkyl group comprising about eight to about thirty carbon atoms; and
      (ii) an aliphatic polyol, a cycloaliphatic polyol, an alkanol substituted arene polyol, or a mixture of one or more of the foregoing, the polyol comprising from about three to about ten carbon atoms and at least two hydroxy groups being primary or secondary; and
   (c) a catalytically effective amount of an acid catalyst.

2. An epoxy adhesive composition according to claim 1, wherein said moiety separates the carboxyl groups by about two to about eight carbon atoms and comprising an appended alkyl group comprising about eight to about thirty carbon atoms.

3. An epoxy adhesive composition according to claim 1 wherein said polyol comprises about four to about eight carbon atoms.

4. An epoxy adhesive composition according to claim 1 wherein said moiety separates the carboxyl groups by two to about eight carbon atoms and comprising an appended alkyl group comprising about twelve to about twenty-four carbon atoms and said polyol comprises about four to about eight carbon atoms.

5. An epoxy adhesive composition according to claim 1 wherein said composition is cured.

* * * * *